US010126571B2

(12) United States Patent
Junkins

(10) Patent No.: US 10,126,571 B2
(45) Date of Patent: Nov. 13, 2018

(54) MULTI-FUNCTIONAL GLASSES

(71) Applicant: Mitch Junkins, Newport Beach, CA (US)

(72) Inventor: Mitch Junkins, Newport Beach, CA (US)

(*) Notice: Subject to any disclaimer, the term of this patent is extended or adjusted under 35 U.S.C. 154(b) by 0 days.

(21) Appl. No.: 13/714,203

(22) Filed: Dec. 13, 2012

(65) Prior Publication Data
US 2013/0194538 A1 Aug. 1, 2013

Related U.S. Application Data

(60) Provisional application No. 61/570,731, filed on Dec. 14, 2011, provisional application No. 61/595,514, filed on Feb. 6, 2012.

(51) Int. Cl.
*G02C 9/00* (2006.01)
*G02C 9/04* (2006.01)
*G02C 7/08* (2006.01)

(52) U.S. Cl.
CPC ............... *G02C 9/04* (2013.01); *G02C 7/086* (2013.01); *G02C 2200/08* (2013.01)

(58) Field of Classification Search
CPC ......... G02C 7/104; G02C 7/107–7/108; G02C 7/12; G02C 7/08; G02C 9/04; G02C 9/00
USPC .............. 351/41, 44, 47, 57, 571.57, 571.66
See application file for complete search history.

(56) References Cited

U.S. PATENT DOCUMENTS

| 3,628,854 | A | * | 12/1971 | Jampolsky | ............... 351/159.58 |
| 5,708,490 | A | * | 1/1998 | Wieczorek | .............. A61F 9/022 2/8.1 |
| 6,557,995 | B1 | * | 5/2003 | Edwards | .................. G02C 7/16 351/44 |
| 7,036,929 | B1 | * | 5/2006 | Harvey | .................. G02C 5/126 351/159.02 |
| 2008/0062378 | A1 | * | 3/2008 | McCracken | ............. G02C 7/10 351/57 |
| 2011/0181828 | A1 | * | 7/2011 | Yi et al. | .......................... 351/47 |
| 2011/0205626 | A1 | * | 8/2011 | Saylor et al. | ................. 359/465 |

* cited by examiner

*Primary Examiner* — Robert E Tallman
(74) *Attorney, Agent, or Firm* — Rutan & Tucker, LLP; Hani Z. Sayed

(57) ABSTRACT

A multipurpose eyewear system and apparatus is provided. An embodiment provides a film, vinyl, or other substance that may be removably applied to the lenses to provide the lenses with additional functionality. An embodiment provides a contoured and flexible frame and lens system that fits to a users face. Additional functionality may be included by removable/replaceable lenses and/or removable/replaceable films. An embodiment provides a replaceable lens system that is either contoured or flat to provide compact and easy manufacturing, shipping, cleaning, and storing.

9 Claims, 5 Drawing Sheets

MULTI-FUNCTIONAL GLASSES

CROSS REFERENCE TO RELATED APPLICATIONS

This application claims priority under 35 U.S.C. § 119(e) to U.S. Provisional Patent Application No. 61/570,731, filed Dec. 14, 2011 entitled "3D Glasses Including Removable Film;" and U.S. Provisional Patent Application No. 61/595,514, filed Feb. 6, 2012, entitled "3D Glasses Including Removable Film," each of which are incorporated by reference in their entirety herein.

FIELD OF THE INVENTION

The field of the invention is for eyewear. More specifically, the field of invention generally relates to an apparatus and system for glasses having different functionalities.

BACKGROUND

Eyeglasses have been used for many years and for various purposes, including as prescription eyeglasses, sunglasses, reading glasses, 3D glasses, glasses with magnifying lenses, safety glasses, stylistic glasses, etc. However, a user generally requires a separate pair of eyeglasses for each purpose, e.g., a separate pair of prescription glasses, a separate pair of glasses for reading, a separate pair of sunglasses, and a separate pair of 3D glasses. In some instances multiple uses have been permanently combined into a single pair of eyeglasses, e.g., glasses with bifocal lenses incorporate two different prescriptions into a single pair of eyeglasses, and prescription sunglasses combine sunglasses functionality with prescription lenses. In these instances, the lenses of the glasses have the different properties permanently combined, and a user does not have the ability to change the functionality, or add to the functionality, of the glasses whenever desired. It is desirable to provide a user with a single pair of eyeglasses that can easily be customized by the user for multiple purposes whenever desired by the user. This would largely eliminate the need for a user to have multiple pairs of glasses or frames, each for a different purpose.

The ability to use a regular pair of eyeglasses as three dimensional (3D) eyewear and/or have multifunctional 3D eyewear is particularly desirable. 3D eyewear has been around for a long time. However, they were infrequently used because the technology needed to make 3D successful was expensive and not very good. The technology to make the viewing of 3D movies/pictures required that the user or viewer wear special eyewear to be able to perceive the 3D experience.

3D eyewear was typically in the form of glasses which allowed the viewer to visually perceive stereoscopic motion pictures and typically incorporate temple-pieces and frames. In order for the viewer that may be watching a movie or the like to be able to see the 3D picture, each and every member is typically required to wear special 3D glasses to achieve the desired 3D picture.

Many modern movies now require the use of these 3D glasses to view and fully experience the entirety of the movie occurrence. These newer, modern movies use advanced computer technology to really give the viewing public a more intimate movie-going experience. Typically, because each user must utilize the 3D glasses, these glasses are handed out to movie patrons prior to their entrance into the theatre.

Because the movie theatres typically provide the 3D eyewear to the user at no cost, it is advantageous to have the eyewear be re-usable once the movie experience is finished. Therefore, many theatres provide receptacles at the exit of the theatre where the users may place their 3D eyewear after use. After collection of the eyewear, the theatre may clean the eyewear and re-use them for the next movie that shows.

This creates several problems. First, if the eyewear is not correctly or adequately cleaned, it can contain considerable amounts of germs because of their inadequate cleansing. Secondly, and more importantly, because of repeated use and neglect, the lenses of the eyewear may become scratched, bent, damaged or otherwise unusable. However, because of the costs, they are often used by new viewers with the defects in place. Therefore, the experience to the secondary viewers is greatly diminished.

There are also many other problems with these 3D glasses out in the market today. Most modern, traditional 3D glasses are constructed with either cardboard or plastic framed materials which incorporate the proper 3D lens therein. Viewers who do not wear corrective spectacles while viewing motion pictures may easily wear the existing 3D glasses. But, viewers requiring corrective lenses such as prescription glasses have more difficulty with these types of 3D eyewear because they must wear the 3D glasses over, or on top of/in front of, their corrective prescription eyewear. This can be problematic and the refraction of two pairs of eyewear can distort the picture and can be uncomfortable for the individual viewer that is required to wear two sets of glasses.

Additionally, some of the prior art eyewear is constructed with frames that may result in an unpleasant viewing experience. For example, most 3D glasses are constructed in only one size which means users big and small must wear the exact same eyewear and it may be ill fitting for that particular user. Today's cardboard and plastic 3D glasses usually include temple-pieces and frames that are relatively expensive, especially when considering that movie theaters typically supply 3D glasses at no charge to the user.

An additional problem with prior art 3D type glasses is that they are inflexible, and not very durable. A primary issue concerning 3D glasses is that in order to illustrate to a user the 3D content that they are viewing, the lens is typically flat having little or no contour. A lens having no contour is prone to have more issue with damage as it is not easily flexed to accommodate different storage facilities and the like. Additionally, because the lens is flat, the 3D glasses will not conform to the head of the individual user, which makes the entire apparatus uncomfortable to wear. Additionally, the lack of contour and curvature would lead to awkward viewing by the individual user.

Accordingly, 3D glasses may be made that include corrective lenses, in multiple sizes, or are otherwise customized for a subset of users. Customization may lead to greater expense, which may be passed on to the consumer. Users may be less willing to purchase more expensive glasses for use as 3D glasses in a movie theatre, home, or for any other 3D viewing experience.

SUMMARY OF THE INVENTION

In an exemplary embodiment of the present invention, a multipurpose eyewear system is described including an eyewear apparatus comprising: a frame portion, a lens portion attached to the frame portion; and a removable film, the removable film being attachable to and removable from the lens portion of the eyewear apparatus, and the removable film also being configured to provide additional functionality to the lens portion of the eyewear apparatus when attached thereto.

In an exemplary embodiment the present invention, a multipurpose eyewear system comprising: a frame portion; a lens portion attached to the frame portion; and a removable film attachable to and removable from the lens portion of the eyewear apparatus, the removable film configured to provide additional functionality to the lens portion of the eyewear apparatus when attached thereto.

In an exemplary embodiment, wherein the removable film provides 3D functionality.

In an exemplary embodiment, wherein the lens portion is a prescription lens.

In an exemplary embodiment, wherein the removable film is configured as a color anaglyph filter.

In an exemplary embodiment, wherein the removable film is linearly polarized.

In an exemplary embodiment, wherein the removable film is circularly polarized.

In an exemplary embodiment, wherein the removable film is configured as a special interference filter.

In an exemplary embodiment, wherein the removable film provides sunglasses functionality.

In an exemplary embodiment, wherein the removable film comprises multiple layers of darkening film.

In an exemplary embodiment, wherein the removable film comprises a multilayer film.

In an exemplary embodiment the present invention, an multipurpose eyewear system comprising: a frame portion including a lens receiving area; and at least two pairs of interchangeable lenses, each pair of interchangeable lenses attachable to and removable from the lens receiving area of the frame portion, and each pair of interchangeable lenses being configured to provide different functionality to the eyewear apparatus when attached thereto.

In an exemplary embodiment, wherein at least one pair of interchangeable lenses is 3D lenses.

In an exemplary embodiment, wherein at least one pair of interchangeable lenses is sunglasses lenses.

In an exemplary embodiment, wherein the lens receiving area comprises a circumferential recess into which the interchangeable lenses can be inserted.

In an exemplary embodiment, wherein the lens receiving area comprises at least one latch for holding the interchangeable lenses in the lens receiving area.

In an exemplary embodiment, further comprising a removable film, the removable film being attachable to and removable from at least one pair of interchangeable lenses, and the removable film also being configured to provide additional functionality to at least one pair of interchangeable lenses when attached thereto.

In an exemplary embodiment, further comprising a nose bridge portion hinged to the frame portion whereby the hinged portion may pivot about the frame portion.

In an exemplary embodiment, wherein the nose bridge portion includes a tab that locks over a front portion of at least one pair of interchangeable lenses to retain the at least one pair of interchangeable lenses to the frame portion.

In an exemplary embodiment, further comprising a nose bridge portion removably attached to the frame portion whereby the nose bridge portion retains at least one pair of interchangeable lenses to the frame portion.

In an exemplary embodiment the present invention, an multipurpose eyewear system comprising: a contoured frame portion configured to generally conform to a person's head; and curved lenses configured to provide a three-dimensional effect, wherein the curved lenses correspond to the contour of the frame portion and at least one of the contoured frame portion and the 3D curved lenses are flexible.

In an exemplary embodiment, the interchangeable and re-usable eyewear apparatus and system may be utilized to view a 3D movie/show, for theatres in place of traditional 3D eyewear, and/or as sunglasses. In an exemplary embodiment, the removable film and/or lenses provide 3D functionality, prescription, polarizer, filter, sunglass, ultraviolet protection, lens damage, or magnifying, and may be applied to a lens that is either non-altering lens, prescription lens, sunglass lens, protective eyewear lens, reading lens, magnifying lens, or combinations thereof.

In another exemplary embodiment, the multipurpose eyewear apparatus and system may include a film or vinyl material generally shaped like a lens in a pair of glasses. It should be understood that the film or vinyl material may be provided in a pair, accommodating one for each lens or as a single film corresponding to a lens that traverses the full face, covering both eyes.

In an exemplary embodiment, the multipurpose eyewear apparatus and system may have a lens portion which is fitted to a standard frame apparatus and may receive a removable film.

Still another exemplary embodiment is to provide an eyewear apparatus and system whereby a three dimensional eyeglass device has at least a frame and a lens portion. The lens portion may be curved and/or contoured.

In yet another exemplary embodiment, an multipurpose eyewear system comprising: an eyewear apparatus comprising: a frame portion; a lens receiving area; and at least two pairs of interchangeable lenses, each pair of interchangeable lenses attachable to and removable from the lens receiving area of the frame portion of the eyewear apparatus by a user, and each pair of interchangeable lenses being configured to provide different functionality to the eyewear apparatus when attached thereto.

In an exemplary embodiment, the interchangeable lenses may be 3D lenses, eyewear lenses, sunglass lenses, magnifying lenses, prescription lenses.

In an exemplary embodiment, the lens receiving area may include a circumferential notch or recess into which the interchangeable lenses can be inserted and held in place, or at least one latch for holding the interchangeable lenses in the lens receiving area.

In an exemplary embodiment, further comprising a removable film, the removable film being attachable to and removable from at least one pair of interchangeable lenses, and the removable film also being configured to provide additional functionality to at least one pair of interchangeable lenses when attached thereto.

In an exemplary embodiment, the film, vinyl material, or other material may be removable.

In an exemplary embodiment, the film, vinyl, or other material may provide a protective material that protects the lens or lenses from scratches or other damage.

In another embodiment, the film, vinyl, or other material may provide ultraviolet (UV) protection to a wearer of glasses including such with film on the lenses.

In yet another exemplary embodiment, the film, vinyl, or other material may be used multiple times.

In another exemplary embodiment, the eyewear, glasses, or systems described herein can allow a user to avoid the use of 3D glasses which have been previously used by another person or persons.

In an exemplary embodiment, the eyewear described herein may be reading glasses.

In another exemplary embodiment, the film, vinyl, or other material may be used in conjunction with other films, such as a permanent or semi-permanent film.

In another exemplary embodiment, the film, vinyl, or other material may be used in conjunction with other removable films.

In another exemplary embodiment, the film, vinyl, or other material may be used in conjunction with darkening/lightening lenses that change from clear to dark based on general brightness in an area where the eyewear is located.

In yet another exemplary embodiment, the film, vinyl, or other material is pre-sized to one or more particular types or styles of eyewear.

In another exemplary embodiment, the film, vinyl, or other material is provided in sets of two.

In another exemplary embodiment, films, vinyl or other materials may be provided in different darkness.

In yet another exemplary embodiment, the film or other material may provide 3D capability.

In yet another exemplary embodiment, the multipurpose eyewear apparatus and system may be constructed of any suitable material including plastic, metal, rubber, cardboard, paper, glass, wood, leather and the like or any combinations thereof.

Another exemplary embodiment is to provide an eyewear apparatus and system whereby a three dimensional eyeglass device has at least a frame and a lens portion wherein the lens portion has a contoured lens that may be flexible and may contour to the head of the individual user.

In an exemplary embodiment, a multi-function re-usable eyewear apparatus and system is provided. The present invention utilizes a three dimensional (3D) eyeglass unit having contoured and curved lenses as opposed to flat lenses seen on prior art 3D eyewear. Additionally, the present invention may utilize a traditional eye glass and/or sunglass lens in conjunction with a film or vinyl layer to provide the 3D glasses with sunglasses capability which may allow the user to change the functionality of the glasses and to have contour to fit the individual user's face. Moreover, it is contemplated that embodiments be utilized with 3D eyeglass apparatuses but can be utilized with any type of eyewear, for example, regular eyeglasses, glasses with magnifying lenses, and the like.

In another exemplary embodiment, the multipurpose eyewear apparatus and system may include a one-time use film and/or replacement lens that is applied to the eyewear and can then be removed after use. For example, it is contemplated that the film and/or replacement lens may be contoured to fit about standard prescription eyewear and may be removed after use, such as when an individual exits a movie theatre.

Still another exemplary embodiment, the multipurpose eyewear apparatus and system may include a one-time use film and/or replacement lens that is applied to the eyewear and can then be removed after use. For example, it is contemplated that the film and/or replacement lens may be contoured to fit about standard prescription eyewear and/or prior art sunglass eyewear to transform otherwise non three dimensional eyeglass wear into three dimensional eyeglass units.

In an exemplary embodiment, the removable film provides 3D functionality, prescription, polarizer, filter, sunglass, ultraviolet protection, lens damage, or magnifying, and may be applied to a lens that is either non-altering lens, prescription lens, sunglass lens, protective eyewear lens, reading lens, magnifying lens.

In an exemplary embodiment, the removable film may be polarized, such as either linearly polarized or circularly polarized. The film may also be configured as a filter, such as a color anaglyph filter, or special interference filter.

In an exemplary embodiment, the removable film may be provided in multiple film layers to combine multiple functions or to enhance functions of the same type by adding additional layers. For example, multiple layers of darkening film may be incorporated to add variable shading.

In yet another embodiment, the film, vinyl, or other material may be one-time removable. The removable film may also be reusable so that it may attached to and be removed from the lens multiple times.

Accordingly, the material may be preinstalled on a pair of lenses of eyewear.

In yet another exemplary embodiment, the eyewear apparatus and system may use other substances that can be applied to the eyewear and removed when in a darkened room.

In another exemplary embodiment, multiple layers of film might be used to allow a user to customize the darkness of the lenses of the eyewear.

Still another exemplary embodiment is to provide eyewear wherein the eyewear may be three dimensional (3D) eyeglass wear.

Yet another exemplary embodiment is to provide 3D contoured eyewear whereby the 3D component of the eye wear may be added to any type of conventional prior art glasses including, but not limited to prescription eyeglasses, sunglasses, reading glasses and the like.

Another exemplary embodiment of the present invention is to provide a 3D glasses apparatus and system whereby a film may be applied to the contoured face of a traditional prior art eyeglass whereby the film, vinyl material, or other material may be removable.

Still another exemplary embodiment of the present invention is to provide a 3D glasses apparatus and system whereby a film may be applied to the contoured face of a traditional prior art eyeglass and whereby a protective material may be provided that protects the contoured or curved lens or lenses from scratches or other damage.

In still another exemplary embodiment, a contoured 3D glass is provided whereby a film, vinyl, or other material may provide ultraviolet (UV) protection to a wearer of glasses including such with film on the lenses.

Yet another exemplary embodiment is to provide 3D eyewear, glasses, or systems which may allow for contoured lenses and/or curvature of the lens of 3D glasses which had previously only been straight lenses without contour and/or curvature.

In another exemplary embodiment, a 3D eyewear is provided whereby it is contemplated that traditional prior art glasses such as prescription eyewear, sunglasses, reading glasses, magnifying glasses and the like may be utilized with a film, vinyl, or other material to provide 3D viewing of 3D content.

In a further exemplary embodiment, a multi-purpose eyewear apparatus and system may have at least a frame portion, a lens portion and a nose bridge portion.

Yet another exemplary embodiment is to provide a multipurpose eyewear apparatus and system that may allow for interchangeability of the contoured lenses of a 3D lens for a traditional eyeglass/sunglass lens.

Among the many different possibilities contemplated, the apparatus may have at least a frame portion whereby the frame portion has at least a hinged or pivoting nose bridge portion.

The nose bridge portion may pivot or hinge to the frame and may extend upward and away from the frame portion to allow for insertion of the lens into grooves in the bottom area of the frame.

Once the lens portion has been inserted into the grooves in the bottom area of the frame, the nose bridge portion may be pivoted or hinged back into its standard place and locked against both the lens and the frame whereby the nose bridge portion may allow for the lens to stay in communication with the frame portion when in the locked position.

In an exemplary embodiment, a multipurpose eyewear apparatus and system may be provided whereby in an exemplary embodiment, the frame may have a plurality of grooves for insertion of a contoured and curved lens into same.

In another exemplary embodiment, the polarized 3D glasses may be circularly polarized, with, e.g., one lens using clockwise circular polarization and the other anti-clockwise circular polarization. Circular polarization may be used so the image separation is maintained even if the viewer tilts their head which would not be possible with the more usual linear polarizer. Polarized 3D glasses allow for viewing 3D images in color. Other kinds of 3D glasses may use electronic shutters or LCD shutter glasses.

In another exemplary embodiment the colored lenses or polarized lenses may be incorporated into a film which may be removable.

The present invention relates to a re-usable eyewear apparatus and system. The present invention relates to an interchangeable lens system which may allow the user to change out the lenses of an eyeglass frame with new lenses. Additionally, it is contemplated that the present invention be utilized with 3D eyeglass apparatuses but can be utilized with any type of eyewear. Moreover, the eyewear may have a pivoting nose portion which may pivot away from the frame to allow for removal and re-insertion of the lens portions to the eyeglass apparatus. In another exemplary embodiment, the nose portion may be completely removable and may snap onto the lens and lock around the frame of the eyewear and may be removable to allow for subtraction of the lens from the frame.

Yet another exemplary embodiment is to provide an interchangeable and re-usable eyewear apparatus and system that may allow for interchangeability of lenses as desired by the individual user.

It is contemplated that another exemplary embodiment is to provide an interchangeable and re-usable eyewear apparatus and system that may allow for re-sized and re-shaped lenses to be adapted to the frame whereby the frame may be a one-size fits all apparatus, but the lenses may be suited for adaption to those needing either larger or smaller lenses.

In an exemplary embodiment, it is contemplated that another exemplary embodiment is to provide an interchangeable and re-usable eyewear apparatus and system whereby the apparatus may have a snap on nose bridge portion whereby the nose bridge portion may snap over the lens and lock around the frame.

It is further contemplated that another exemplary embodiment is to provide an interchangeable and re-usable eyewear apparatus and system whereby the apparatus has a snap in lens portion which may be adapted around a hinged nose bridge portion.

Among the many different possibilities contemplated, the apparatus may have at least a frame portion whereby the frame portion has at least a hinged or pivoting nose bridge portion.

The nose bridge portion may pivot or hinge to the frame and may extend upward and away from the frame portion to allow for insertion of the lens into grooves in the bottom area of the frame. Once the lens portion has been inserted into the grooves in the bottom area of the frame, the nose bridge portion may be pivoted or hinged back into its standard place and locked against both the lens and the frame whereby the nose bridge portion may allow for the lens to stay in communication with the frame portion when in the locked position.

In an exemplary embodiment, an interchangeable and re-usable eyewear apparatus and system may be provided whereby in an exemplary embodiment, the frame may have a plurality of grooves for insertion of replacement lenses into same.

In still another exemplary embodiment, an interchangeable and re-usable eyewear apparatus and system may be provided whereby the apparatus may have a nose bridge portion which may hinge down and lock over the front center portion of the lens.

In yet another exemplary embodiment, an interchangeable and re-usable eyewear apparatus and system may be provided whereby the apparatus may have a plurality of lenses which snap into place in the frame.

In an exemplary embodiment, the multipurpose eyewear apparatus and system may include a film holder to hold film that may be applied to one or more lenses of the eyewear. The film holder may include multiple envelopes or sleeves in which different sets of removable films may be stored. The holder may also include a lens holder portion to hold interchangeable lenses for the associated frames.

Various objects, features, aspects and advantages of the present invention will become more apparent from the following detailed description of preferred embodiments of the invention, along with the accompanying drawings in which like numerals represent like components.

DESCRIPTION OF THE DRAWINGS

FIG. 8 illustrates an exemplary embodiment of an eyewear frame and lens system permitting the interchangability of the lenses according to embodiments described herein, in which

FIG. 9 illustrates an exemplary embodiment of an eyewear frame and lens system permitting the interchangability of the lenses according to embodiments described herein, in which

FIG. 10 illustrates an exemplary embodiment of an eyewear frame and lens system permitting the interchangability of the lenses according to embodiments described herein, in which

DETAILED DESCRIPTION

Figure 1:
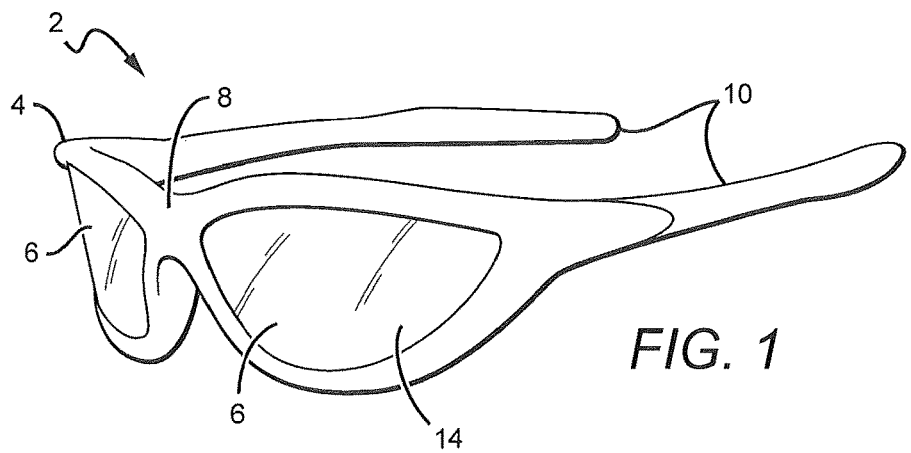
FIG. 1 illustrates an exemplary embodiment of the e-ye apparatus in accordance with the disclosure.

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Exemplary embodiments described herein include glasses systems including a removable film to provide additional and/or different functionality to glasses. The film may be provided in multiple layers to combine different functions or impose a greater degree of a single desired function. The films may be one time use, or reusable such that it may be applied, removed, stored, and reapplied.

Exemplary embodiments described herein include glasses systems including lenses and frames that are combinable/recombinable for easy shipping, storing, use, and cleaning. The lens and frames may only permit initial connection without easy release, or may permit release for recombination with the same or different lens/frame combinations. The lens may be interchangeable to permit various glasses functionality and/or sizing for individual uses.

Exemplary embodiments described herein include glasses systems including lenses and frames that are contoured and curved to conform to a user's face. The frame and or lenses may be flexible to permit easy storing or provide additional comfort to a larger range of user profiles.

Exemplary embodiments also include a storage container for any of the described lens/frame/film combinational embodiments described herein. The storage container may include a receptacle for the frame, or frame and lens system, a compartment for interchangeable lenses, and a compartment/envelope/pouch for interchangeable films.

Although embodiments of the invention may be described and illustrated herein in terms of glasses for three-dimensional (3D) viewing, it should be understood that embodiments of this invention are not so limited, but are additionally applicable to glasses of various and interchangeable lenses, frames, and film types. For example, embodiments described herein may be used for combing functionality of sunglasses, prescription, magnification, eye protection, surface/lens protection, 3D, polarization, etc. These functions may be combined in one or more ways such that the lens including one or more functions, while one or more films provide one or more other or more of the same function. In general, embodiments described herein disclose adding 3D functionality for use at theatres and at home for viewing movies. However, embodiments as described herein are also applicable to other uses and industries. For example, shading films may be provided by an optometrist to attached to a user's regular glasses and shade a users eyes after an exam requiring pupil dilation. Embodiments, as described herein provide easy manufacture for various uses to accommodate these needs by a single process that permits easy storage, shipping, use, cleaning, and customizability without the added expense. Accordingly, these multiple uses including different combination of glasses functionality are all encompassed by the present disclosure.

In addition, various embodiments are described herein directed toward films for use on glasses, interchangeable lenses for use with frames, as well as contoured and flexible lens/frame combinations. It is understood that the embodiments described herein are fully combinable in any combination or sub-combination of features. Accordingly, the replaceable lenses may be used with the removable films and be incorporated into a flexible and contoured frame. Accordingly, the embodiments described herein are by way of example only and are not intended to be limited in the features shown by individual figures or detailed embodiments. Embodiments may include additional features described by other exemplary illustrated embodiments or may not include features shown and described. Accordingly, and combination of features is encompassed by the present disclosure.

Figure 2:
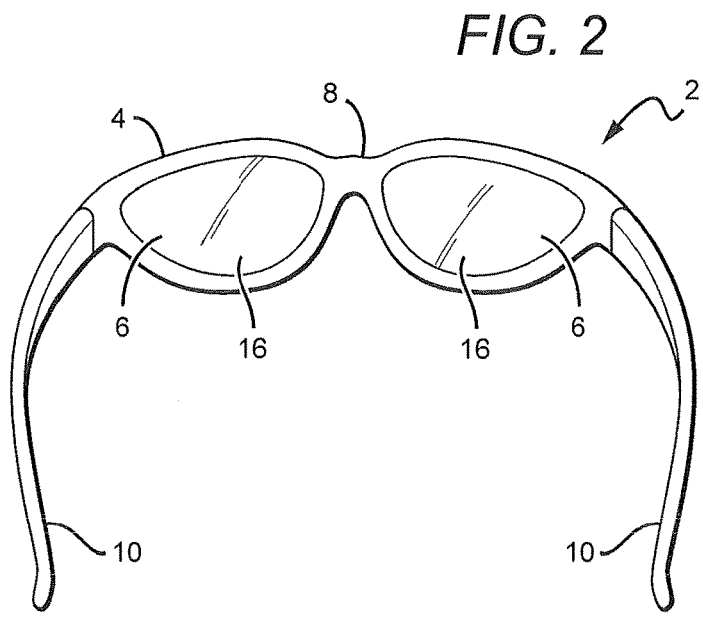
FIG. 2 illustrates an exemplary embodiment of the eyewear apparatus in accordance with the disclosure as viewed from the back.

Turning now to the drawings, FIGS. 1-9 are illustrative of various embodiments of the multipurpose eyewear system and apparatus of the present invention. In FIG. 1, eyewear apparatus 2 of a multipurpose eyewear system is shown. In FIG. 2, eyewear apparatus 2 is shown as viewed from the back. Eyewear apparatus 2 includes a standard frame apparatus or frame portion 4 adapted to fit around the head of an individual user. Frame portion 4 includes attached lens portion 6, nose bridge 8, and temple-pieces 10. Lens portion 6 has a front surface 14 and a back surface 16. Nose bridge 8 may optionally be hinged to the frame portion whereby the hinged portion may pivot about the frame portion and extend away therefrom. Also, temple-pieces 10 may optionally be attached to the frame front by hinges, be shaped or molded to extend directly from the frame front, or be attached or formed by other attachment mechanisms. Eyewear apparatus 2 can be any type of eyeglasses, including standard prescription glasses, non-prescription glasses, sunglasses, 3D glasses, glasses with magnifying lenses, safety glasses, etc.

Figure 3:
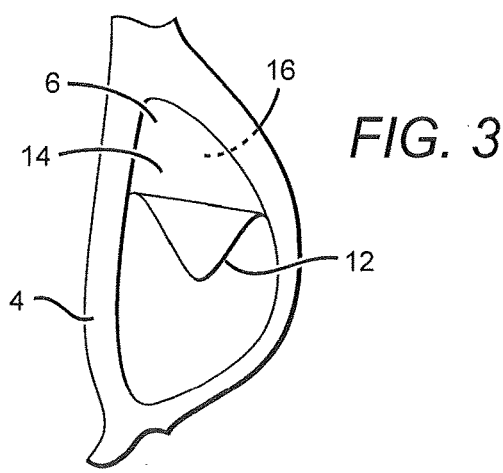
FIG. 3 illustrates an embodiment of a lens portion in accordance with an exemplary embodiment that includes a removable film applied to the front surface of the lens portion.

The multipurpose eyewear system of the present invention may include eyewear apparatus 2 and a removable film 12 which may be selectively applied to lens portion 6. The multipurpose eyewear apparatus and system may be constructed of any suitable material including plastic, metal, rubber, cardboard, paper, glass, wood, leather and the like or any combinations thereof As shown in FIG. 3, Removable film 12 is sized and shaped to match the size and shape of front surface 14 of lens portion 6 and overlay front surface 14. However, other sizes and shapes of removable film 12 are contemplated, e.g., removable film 12 may cover only a limited area of lens portion 6 or may extend beyond lens portion 6 and cover some of frame portion 4. Removable film 12 can be pre-sized to fit and/or be used with one or more particular types or styles of eyewear. Alternatively, removable film 12 may be provided in a large size that may be cut by a user to match approximately the size and shape of various lenses and eyewear designs. Also, removable film 12 may optionally include a curved shape to match the curvature of the lenses of a pair of glasses.

While FIG. 3 shows removable film 12 applied to the front surface 14 of lens portion 6, removable film 12 may alternatively be configured for application to the back surface 16 of lens portion 6. Indeed, depending on the method used to apply removable film 12 to lens portion 6, it may be preferable to apply removable film 12 to back surface 16, e.g., if the film serves its function better when applied to the back, or if an adhesive is used that is more likely to distort the image when viewed in one direction as compared to the other direction.

Removable film 12 may be added to or removed from lens portion 6 when desired by the user of the glasses. Removable film 12 may be a one-time use film (or vinyl or other material) that is applied to lens portion 6 for a desired purpose and can then be removed and discarded after use, e.g., when exiting a movie theatre, when entering a darkened room, when going from inside to outside, when going from outside to inside, etc. Alternatively, removable film 12 may be preinstalled on a pair of lenses of eyewear, and may be one-time removable. Alternatively, removable film 12 may be reusable for multiple applications and removals as needed. Or removable film 12 may be designed for long term application and use. Removable film 12 may be provided in pairs, one for each lens, or alternatively, removable film may be provided individually for each lens.

Figure 4:
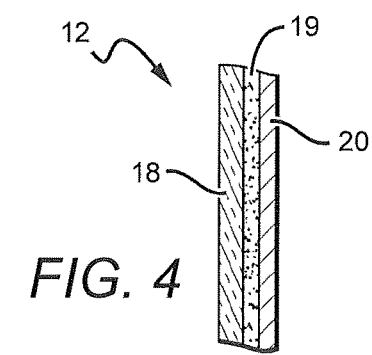
FIG. 4 illustrates a side view of an exemplary embodiment of removable film with an adhesive layer.

FIG. 4 depicts a cross-sectional side view of removable film 12. The base layer 18 of removable film 12 may be manufactured from various suitable resins, including polyolefin resins, vinyl chloride resins, polyester resins, styrene resins, polyvinyl alcohol resins, acrylic resins, vinylidene chloride resins, polyurethane resins, other base film resins listed in U.S. Pat. No. 5,972,453 (Akira et al., which patent is incorporated in its entirety by reference herein), or any other suitable transparent material. The various embodiments of the invention are discussed throughout in terms of removable film, but the reference to "removable film" herein encompasses the use of any lens overlay used to accomplish the same purposes as the removable film described herein, e.g., a vinyl layer or other suitable transparent material. Creation of other suitable lens overlays regarding removable film 12 and its uses are encompassed by the present disclosure.

As shown in FIG. 4, removable film 12 may also include an adhesive layer 19 for adhering removable film 12 to lens portion 6. Any suitable adhesive may be used. Preferably, the adhesive will be clear and not cause any significant distortion to images or objects viewed through lens portion 6. It is also preferred that the adhesive have a low adhesive strength so that removable film 12 may be easily removed from lens portion 6 without damage to the lenses or staining the lenses. Low adhesive strength adhesives like those listed in U.S. Pat. No. 5,972,453 are suitable. For example, the low strength adhesive may comprise a polyurethane. A low strength polyurethane adhesive may comprise a polyurethane elastomer comprising (1) a soft segment comprising a long chain polyol, and (2) a hard segment comprising a diisocyanate compound and a chain extension agent as described in U.S. Pat. No. 5,972,453, which is incorporated by reference in its entirety.

The adhesive layer 19 may be covered by a peel-off backing 20 when removable film 12 is not in use. When the user decides to apply removable film 12 to lens portion 6, the user may peel off the backing 20 to expose the adhesive layer 19, and then attach the removable film 12 by applying the adhesive layer 19 to lens portion 6. Any bubbles trapped between removable film 12 and lens portion 6 may be removed by pushing the bubbles to the edges of removable film 12. A credit card or other object may be used to eliminate bubbles by guiding or pushing the bubbles to the edge and flattening removable film 12 against lens portion 6.

Alternatively, removable film 12 may be attached to lens portion 6 via other means that do not employ an adhesive. For example, removable film 12 may be attached by electrostatic attraction. Or the edges of removable film 12 may wrap around part of frame portion 4 in order to hold the film in place. Alternatively, frame portion 4 may include a notch, recess, ridge, and/or other physical means adjacent to lens portion 6 into which removable film 12 may be inserted and held in place. Other means may also be used as long as removable film 12 can be held roughly in place in relation to lens portion 6.

Removable film 12 may be configured to change the functionality of, or provide additional functionality to, lens portion 6 and eyewear apparatus 2 for the time it overlays the lenses, e.g., by changing how light passes through lens portion 6. Various types of removable film 12 may be selectively applied to lens portion 6 each to impart a different or additional functionality to eyewear apparatus 2. For example, removable film 12 may be configured to impart 3D, sunglasses, magnifying, protective, or other functionality to eyewear apparatus 2. In some embodiments, the film may be colored, have a pattern, or have other decorative designs.

In a representative embodiment, eyewear apparatus 2 is a pair of prescription eyeglasses that can be customized for 3D functionality. 3D functionality may be provided to the prescription eyeglasses by applying 3D-capable removable film to the prescription lenses. When removable film 12 is configured to impart 3D functionality and is applied to the lens portion 6, eyewear apparatus 2 may be utilized to view a 3D movie, 3D television show, 3D picture, etc.

The illusion of three dimensions on a two dimensional surface can be created by providing each eye with different visual information. 3D glasses usually create the illusion of three dimensions by filtering out the light not intended for that eye, resulting in each eye receiving a different image. For example, removable film 12 may be provided as a pair of color anaglyph filters, e.g., having one red film for one lens and one blue or cyan film for the other lens. Other color anaglyph combinations or techniques may alternatively be incorporated into removable film 12 for use in imparting 3D functionality to a user's eyeglasses.

Removable film 12 may also be provided with polarized filters for viewing 3D images. The polarized removable film 12 may be linearly polarized or circularly polarized, e.g., one lens using clockwise circular polarization and the other anti-clockwise circular polarization. Circular polarization may be used so the image separation is maintained even if the viewer tilts his or her head which would not be possible with the more usual linear polarizes. Polarized 3D removable film 12 allows for viewing 3D images in color.

Removable film 12 may be configured for other methods of 3D image viewing as well. For example, removable film 12 may be configured for 3D viewing using interference filter technology. Special interference filters (dichroic or dichromatic filters) divide the visible color spectrum into multiple narrow bands. For example, the visible spectrum may be divided into six separate bands, two in the red region (R1 and R2), two in the green region (G1 and G2), and two in the blue region (B1 and B2). The R1, G1 and B1 bands may be used for one eye image, and R2, G2, B2 may be used for the other eye image. The human eye generally does not notice such fine spectral differences, enabling the generation of full-color 3D images with only minor color differences between the images viewed with each eye.

The multipurpose eyewear system of the invention may be utilized in theatres in place of traditional 3D eyewear or the 3D eyewear provided by the theatre. The multipurpose eyewear system allows a user to avoid the use of 3D glasses which have been previously used by another person or persons, which may help prevent the spread of germs and communicable disease from one person to another. Further, user discomfort and other problems arising from using a theater provided pair of 3D eyeglasses is avoided because the user may customize his/her own pair of eyeglasses to watch the 3D movie. The current invention enables theaters to provide 3D removable film to moviegoers to use with their own glasses, as an alternative to the 3D eyeglasses currently distributed.

Other types of removable film 12 may also be provided that are configured to impart functionality other than 3D to eyewear apparatus 2. For example, a type of removable film 12 may be darkening film configured to impart sunglasses functionality or darken lens portion 6. Either a single layer of darkening film or multiple layers of darkening film might be used to allow a user to customize the darkness of the lenses of the eyewear. Film of varying darkness may be provided for use in areas of different levels of darkness or light. Alternatively, one may use other lens darkening substances that can be applied to the eyewear and removed when in a darkened room. Further, removable film 12 may be configured to provide ultraviolet (UV) protection to a wearer of glasses, e.g., by incorporating ultraviolet absorbing agents into the base film or adhesive layer.

Other sets of removable film 12 configured for other purposes may also be used. For example, removable film 12 may also be provided that is configured to comprise a protective material that protects the lens or lenses from scratches or other damage. Another type of removable film 12 may be configured to magnify items or images viewed through the glasses. Another type of removable film 12 may be glare-reducing. Removable film 12 may also be provided that is primarily designed for decoration or making stylistic changes to a pair of glasses, e.g., the film may be provided in different colors or include a variety of patterns and/or designs. The invention contemplates a wide variety of removable film that may be used, and contemplates that different film can be used at different times as desired by the user.

Removable film 12 may be used in conjunction with other films, such as a permanent film or a semi-permanent film. Also, removable film 12 may be used in conjunction with other removable films, and multiple layers of removable film may be applied for a desired effect, e.g. to create the optimal darkening of the lenses based on the surrounding light. In some instances, it may be desirable to add multiple layers of removable film 12 of different types to provide multiple functionalities simultaneously, e.g., 3D functionality combined with sunglasses and/or protective functionality, etc. Accordingly, removable film 12 may comprise a multilayer film.

Generally, removable film 12 as used to impart 3D, sunglasses, or other functionality should not substantially alter the prescription of the glasses. However, the invention does contemplate configuring removable film 12 to make incremental alterations to a prescription thereby improving eyesight without requiring the user to purchase a new pair of prescription eyeglasses.

In another representative embodiment, eyewear apparatus 2 is configured as a pair of 3D glasses that can be further customized by the addition and/or removal of removable film 12, i.e., a pair of multipurpose 3D glasses. The 3D glasses of this embodiment may be a color anaglyph, e.g., including one red lens and one blue or cyan lens. Alternatively, the lenses of the 3D glasses may be polarized (e.g., linearly polarized or circularly polarized), or special interference filters (dichroic or dichromatic filters) may be used in the lenses as used in interference filter technology. Other 3D glasses that may be used may employ electronic shutters or LCD shutters for viewing a 3D image. Other types of 3D glasses may also be used in conjunction with this invention. Eyewear apparatus 2 in this embodiment may be utilized to view a 3D movie, 3D television show, 3D picture, etc., in place of traditional 3D eyewear or the 3D eyewear provided by the theater, and will have the associated benefits discussed previously.

Similar to the embodiment discussed above, various types of removable film 12 may be selectively applied to lens portion 6 of the 3D glasses of this embodiment to impart different or additional functionality to the 3D glasses. For example, removable film 12 may be configured to impart sunglasses, magnifying, protective, or other functionality as discussed above with respect to the removable film of the other embodiments of this invention. The functions, characteristics, and uses of removable film 12, as described above, apply in generally the same way for this embodiment.

In other embodiments, eyewear apparatus 2 can be a pair of sunglasses, a pair of reading glasses, a pair of glasses with darkening/lightening lenses that change from clear to dark or dark to clear based on general brightness in an area where the eyewear is located, a pair of glasses with magnifying lenses, or any other pair of glasses. In each of these embodiments, eyewear apparatus 2 can be further customized by the addition and/or removal of removable film 12. Similar to the embodiments discussed above, various types of removable film 12 may be selectively applied to lens portion 6, each to impart a different or additional functionality to the glasses of these embodiments. The functions, characteristics, and uses of removable film 12, as described above, apply in generally the same way for these embodiments.

Figure 5:
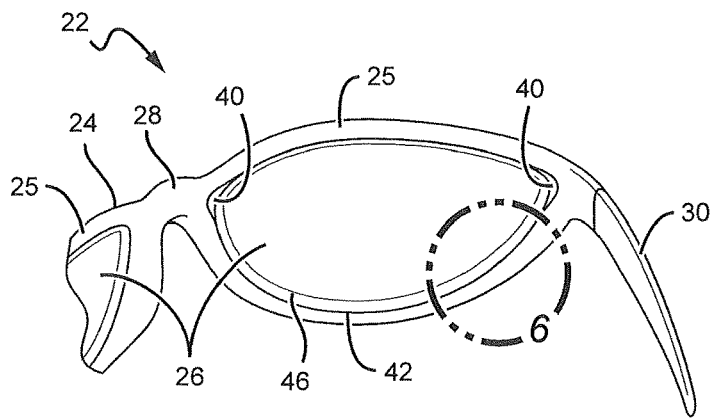
FIG. 5 illustrates an exemplary embodiment of eyewear frames that may be used in conjunction with interchangeable lenses.

In FIG. 5, another exemplary embodiment of a multipurpose eyewear system and apparatus is shown. Eyewear apparatus 22 represents a pair of glasses frames with interchangeable lenses 26. Eyewear apparatus 22 includes a frame apparatus or frame portion 24 adapted to fit around the head of an individual user. Frame portion 24 includes lens receiving area 25, nose bridge 28, and temple-pieces 30. Nose bridge 28 may optionally be hinged to the frame portion whereby the hinged portion may pivot about the frame portion and extend away therefrom. Also, temple-pieces 30 may optionally be attached to the frame front by hinges, be shaped or molded to extend directly from the frame front, or be attached or formed as is otherwise conventional.

Figure 6:
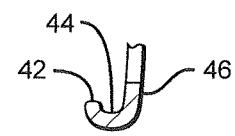
FIG. 6 illustrates a cross-sectional side view of an exemplary embodiment of eyewear frames that may be used in conjunction with interchangeable lenses.

As shown in greater detail in the cut out, cross-sectional side view of FIG. 6, the lens receiving area 25 include a circumferential notch or recess 44 into which various pairs of interchangeable lenses 26 can be inserted and held in place. At the front of frame portion 24, the lens receiving area 25 include a front barrier 46 that abuts the circumferential edges of the front surface of interchangeable lenses 26 to prevent the interchangeable lenses 26 from coming out of the front of frame portion 24. At the back of frame portion 24, on the side of the notch or recess 44 opposite barrier 46, there is a rounded ridge 42. When interchangeable lenses 26 are inserted into the lens receiving area 25, the lenses are inserted from the back of frame portion 24, and the interchangeable lenses 26 are snapped into place over rounded ridge 42 until the edges of interchangeable lenses 26 are located in the notch or recess 44. When located in the notch or recess 44, interchangeable lenses 26 are held in place between barrier 46 and rounded ridge 42.

To remove interchangeable lenses 26 from frame portion 24, one may exert force on the front surface of interchangeable lenses 26 to push the interchangeable lenses 26 over rounded ridge 42 and out of frame portion 24. Optionally, the back of frame portion 24 may include one or more indentations 40 into which the user may insert a finger or tool to pull or leverage the interchangeable lenses 26 backwards out of frame portion 24.

While the multipurpose eyewear system with interchangeable lenses depicted in FIGS. 5-6 uses circumferential notch or ridge 44, front barrier 46, and rounded ridge 42, as a means of temporarily attaching interchangeable lenses 26 to frame portion 24, other means of attaching interchangeable lenses 26 to frame portion 24 are also contemplated. For example, the lens receiving area 25 may include one or more latches or locks that can close to hold interchangeable lenses 26 in place in the lens receiving area 25. Alternatively, a temporary adhesive may be used around the edges of interchangeable lenses 26. Other methods of temporarily attaching interchangeable lenses 26 to frame portion 24 are also within the scope of the present description.

Figure 7:
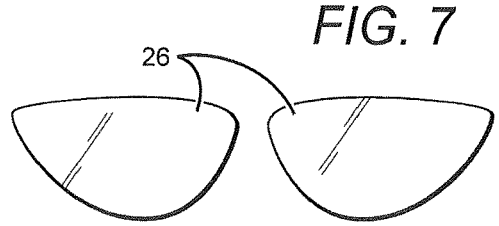
FIG. 7 illustrates an exemplary embodiment of lenses that may be used in conjunction with eyewear described herein.

In FIG. 7, an exemplary embodiment of lenses that may be used in conjunction with eyewear described herein is depicted. The lenses in FIG. 7 are representative of interchangeable lenses 26 of FIGS. 5-6 are labeled as such. The lenses in FIG. 7 are also representative of lens portion 6 as described above and as depicted in FIGS. 1-3.

Interchangeable lenses 26 may be used to provide various functionalities to eyewear apparatus 22. Multiple pairs of interchangeable lenses 26 of varying purposes may be used with the same eyewear frames or apparatus. For example, eyewear apparatus 22 may be provided for use with multiple pairs of interchangeable lenses 26 configured, for example, as 3D lenses for viewing 3D images, darkening lenses for sunglasses functionality, magnifying lenses, and/or other lenses of any desired functionality. A user may remove one pair of interchangeable lenses 26 and replace them with another pair of interchangeable lenses 26 for different purposes as desired. The interchangeable lenses 26 may be reusable multiple times and may be stored in a lens holder between uses or the interchangeable lenses 26 may be limited use or single use lenses. Removable film 12 may also be provided for use in combination with the interchangeable lenses 26 of this embodiment for further customization. The various interchangeable lenses 26 of this embodiment, allow the user to choose the functionality of sunglasses, reading glasses, eyeglasses, or other types of glasses or eyewear, by choosing the appropriate lenses and attaching them to the eyewear frame.

FIGS. 8-10 depict alternate embodiments of interchangeable lenses for use with corresponding eyewear apparatus. Similar elements are denoted with an additional apostrophe to indicate the similarity to the previous description.

In FIG. 8, another exemplary embodiment of a multipurpose eyewear system and apparatus is shown. FIG. 8A illustrates an exemplary front view of an exemplary eyewear apparatus 22' in a combined, ready-for-use configuration. FIG. 8B is an exemplary side view of FIG. 8A. FIG. 8C is an exemplary front view of exemplary eyewear apparatus 22' in a separated configuration. FIG. 8D is an exemplary side view of FIG. 8C. The separated configuration has the interchangeable lenses 26' separated from the frame portion 24'. This configuration permits easy manufacture, storing, shipping, and cleaning of eyewear apparatus, before and after individual use. As shown by the side view of FIGS. 8A and 8D, the interchangeable lenses 26' and frame portion 24' are generally planar. However, these features may also be contoured to better fit an individual's facial profile. They may also be flexibly contoured to accommodate a range of profiles as well and/or for ease of storage.

Eyewear apparatus 22' represents a pair of glasses frames with interchangeable lenses 26'. Eyewear apparatus 22' includes a frame apparatus or frame portion 24'. Frame portion 24' includes lens receiving area 25', nose bridge 28', and temple-pieces 30'. Nose bridge 28' may optionally be hinged to the frame portion whereby the hinged portion may pivot about the frame portion and extend away therefrom. Nose bridge 28' may also optionally be separately attachable to frame portion 24' to further assist in customizing the glasses shape, cleaning the frames/lenses after use, and/or retaining the lens to the frame. Also, temple-pieces 30' may optionally be attached to the frame front by hinges, be shaped or molded to extend directly from the frame front, or be attached or formed.

The lens receiving area 25' include a recess into which various pairs of interchangeable lenses 26' can be inserted and held in place. The lens receiving area 25' includes a front barrier and a back barrier that abuts the top edges of the front and back surfaces, respectively, of interchangeable lenses 26'. Therefore, the top peripheral edge of the interchangeable lenses 26' are retained between the front barrier and the back barrier of the lens receiving area 25'. The lower perimeter portion of lens receiving area 25' is open to permit the interchangeable lenses 26' access to the lens receiving area 25'. The lens receiving area 25' generally corresponds to a top edge of the interchangeable lenses 26'. The lens receiving area 25' may also correspond to one or more side edges along an entire length or partial length of the interchangeable lenses 26'. As shown, the lens receiving area 25' corresponds to the entire top edge, a substantial portion (more than half) of a first side edge near the nose bridge 28' and a lesser portion (less than half) of a second side edge near temple piece 30'. The corresponding portions are illustrative only, more or less of each edge may be used to secure the interchangeable lenses 26' to the frame portion 24'. The lens receiving area may also be along the entire front face of the frame portion 24' if a single interchangeable lens were used instead of the illustrated pair of lenses. In such an embodiment, the lens receiving area may be configured to retain the interchangeable lenses alone, or in combination with a hinged or attachable nose bridge.

In an exemplary embodiment, the top edge of lens receiving area 25' extends beyond the outer side edges of lens receiving area to form notch 44' on opposite sides of lens receiving area 25'. When interchangeable lenses 26' are inserted into the lens receiving area 25', the lenses are inserted from the bottom of frame portion 24', and the interchangeable lenses 26' are inserted between front barrier and back barrier until a corresponding extension on the edges of interchangeable lenses 26' are located in the notch 44' of lens receiving area 25'. When located in the notch 44', interchangeable lenses 26' are held in place for secure use by a user.

To remove interchangeable lenses 26' from frame portion 24', one may exert force by gripping interchangeable lenses 26' to pull the interchangeable lenses 26' from notch 44' and out of frame portion 24. Optionally, the back surface of frame portion may include one or more indentations into which the user may insert a finger or tool to pull or leverage the interchangeable lenses downward out of frame portion.

In FIG. 9, another exemplary embodiment of a multipurpose eyewear system and apparatus is shown. Eyewear apparatus 22" represents a pair of glasses frames with interchangeable lenses 26". Eyewear apparatus 22" includes a frame apparatus or frame portion 24" adapted to fit around the head of an individual user. Frame portion 24" includes lens receiving area 25", nose bridge 28", and temple-pieces 30". FIG. 9 is similar to the eyewear apparatus of FIG. 8, except that the interchangeable lenses 26" incorporates the paid of lenses of FIG. 8 into a unitary piece by include a bridge portion. In addition, the nose bridge 28 illustrates the exemplary optional hinged design to the frame portion whereby the hinged portion may pivot about the frame portion and extend away therefrom.

Figure 9A:
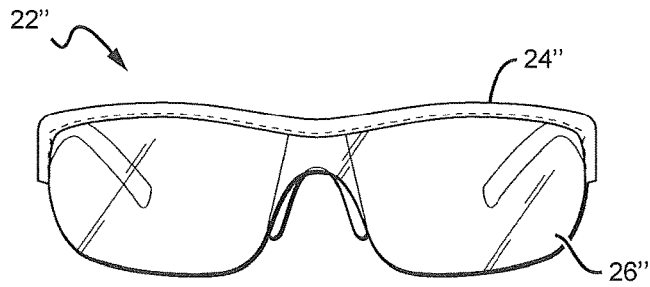
FIG. 9A illustrates the exemplary eyewear apparatus from a front view.
Figure 9B:
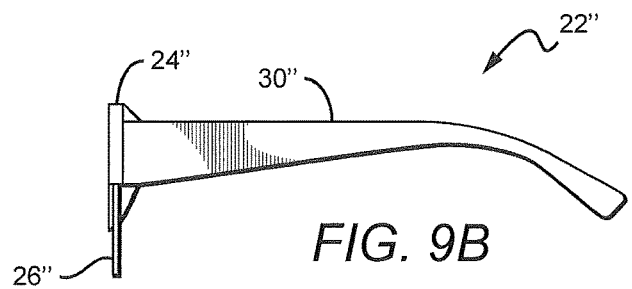
FIG. 9B illustrates the exemplary eyewear apparatus from a side view.
Figure 9C:
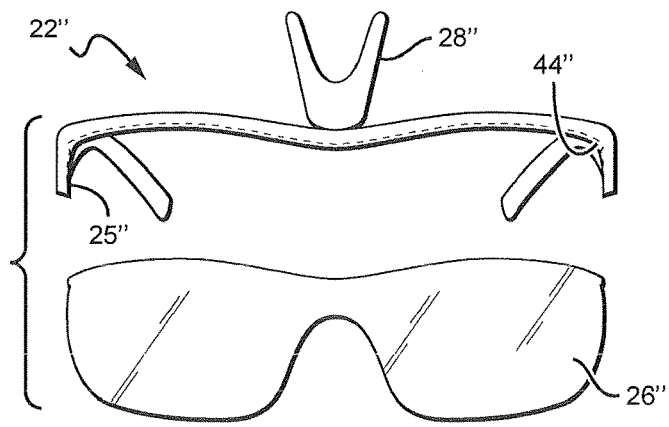
FIGS. 9C and 9D illustrate the exemplary eyewear apparatus in a separated configuration from the front and side, respectively.
Figure 9D:
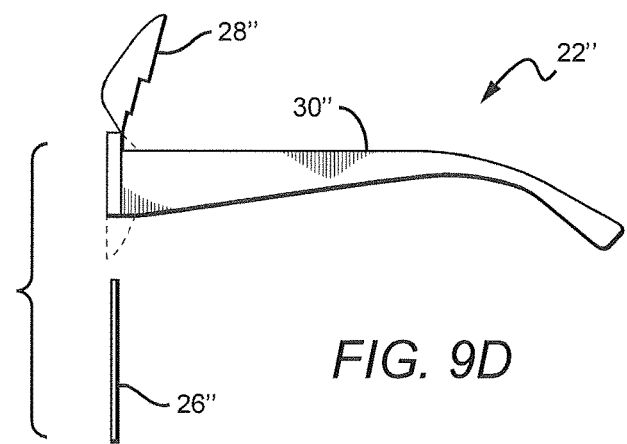

The hinged nose bridge 28" may provide an alternative or additional option for securing the interchangeable lenses 26" to frame portion 24". In an exemplary embodiment, the hinged nose bridge 28" may be secured to a top edge of the frame portion 24". The hinged nose bridge 28" may be hinged or otherwise connected to the frame portion 24" to permit the hinged nose bridge to rotate around the connection between the bridge and the frame portion. As seen in FIG. 9D, the hinged nose bridge may include one or more notches to correspond to the frame portion and the interchangeable lens. For example, the hinged nose portion may be connected to the frame portion through a thin material that is flexible to permit the rotation of the bridge about the frame. The frame portion may include an shaped top boarder for the interchangeable lens, including the front and back surfaces as described above. The hinged nose bridge may include a first indentation to correspond to the shaped top boarder of the frame so that when the hinged nose bridge rotates to a closed position, a ledge of the nose bridge extends the back surface of the frame such that it mates with the frame portion to securely press the interchangeable lens toward the front surface of the frame portion. The hinged nose bridge may include a second indentation to secure and support the interchangeable lens vertically between the second ledge of the hinged nose bridge and the frame portion. The second ledge may include a tab or lock that resiliently hooks around an edge of the interchangeable lens to more securely retain the lens in place. The hinged nose bridge may include a different or additional lock to secure the hinged nose in a closed position with respect to the frame portion. For example, the first ledge may also include a hook or other feature that mates with a corresponding indentation or feature on the frame portion to secure the hinged nose bridge in a closed position, with or without the interchangeable lens present.

To remove interchangeable lenses 26" from frame portion 24", one may exert force on the hinged nose bridge 28" to release the second ledge from under the bridge of the interchangeable lens 26" and rotate the hinged nose bridge 28" away from the interchangeable lens 26". Then a force may be exerted on the interchangeable lens 26" to pull the interchangeable lenses 26" from the notch 44" of frame portion 24". Optionally, the hinged nose bridge may retain the interchangeable lens without the notch of frame portion.

In FIG. 10, another exemplary embodiment of a multipurpose eyewear system and apparatus is shown. Eyewear apparatus 22''' represents a pair of glasses frames with interchangeable lenses 26'''. Eyewear apparatus 22''' includes a frame apparatus or frame portion 24''' with lens receiving area 25''', nose bridge 28''', and temple-pieces 30'''. FIG. 10 is similar to the eyewear system of FIG. 9 except that the nose bridge is a removable pieces separately securable to the interchangeable lenses 26''' and/or frame portion 24'''.

Figure 10A:
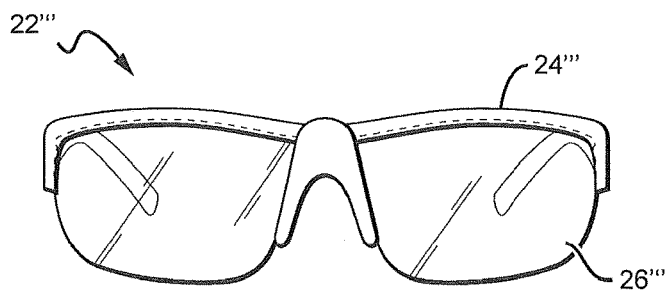
FIG. 10A illustrates the exemplary eyewear apparatus from a front view.
Figure 10B:
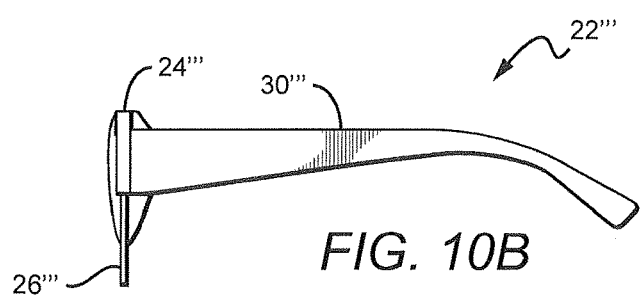
FIG. 10B illustrates the exemplary eyewear apparatus from a side view.
Figure 10C:
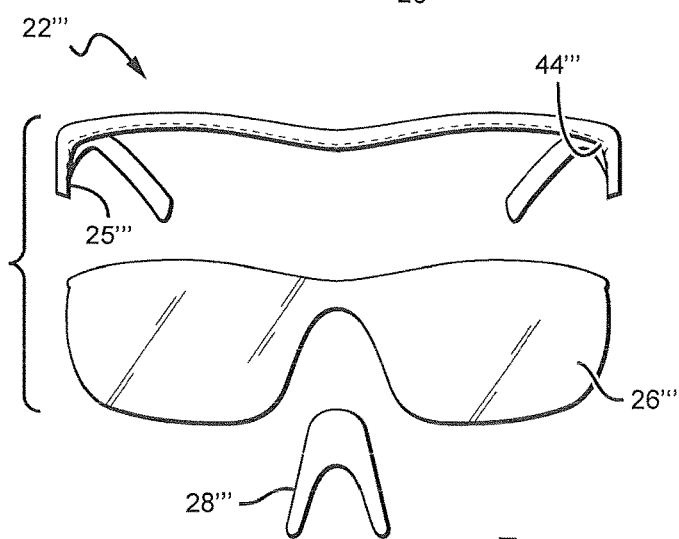
FIGS. 10C and 10D illustrate the exemplary eyewear apparatus in a separated configuration from the front and side, respectively.
Figure 10D:
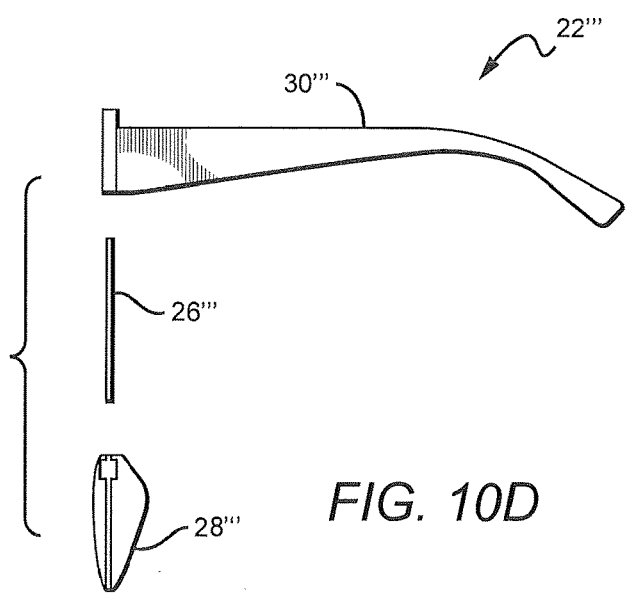

Nose bridge 28''' may include an integrated clip that is generally shaped as the nose bridge saddle. A top of the nose bridge may include a slit to accommodate the insertion of a bottom edge of interchangeable lens 26'''. The slit may create a front and back surface in which the lens rests between supported and/or linked by a bottom edge generally shaped to correspond to the nose ridge of a wearer. a top portion of nose bridge may include a gap sized to accommodate a portion of the frame portion 24'''. The gap may have protections flexibly designed to snap over and/or around the frame portion to retain the nose bridge to the frame portion, thereby locking the interchangeable lens therebetween. Other locking mechanisms are contemplated and are within the present scope of invention. For example, the gap may occur on a back side of the nose bridge and hook to the frame portion by inserting the nose bridge to the frame portion in a front to back direction or vice versa, instead of the upward direction as shown in FIGS. 10C and 10D. Other retention means may include other snap configurations, overlaps, groves, indention/projections, etc. to retain the nose bridge to frame portion and/or interchangeable lens.

To remove interchangeable lenses 26''' from frame portion 24''', one may exert force on the nose bridge 28''' to release the bridge from the frame portion, or otherwise open the clasp or other connection mechanism between the nose bridge and frame. Then a force may be exerted on the interchangeable lens 26''' to pull the interchangeable lenses 26''' from the notch 44''' of frame portion 24'''. Optionally, the nose bridge may retain the interchangeable lens without the notch of frame portion.

Figure 11:
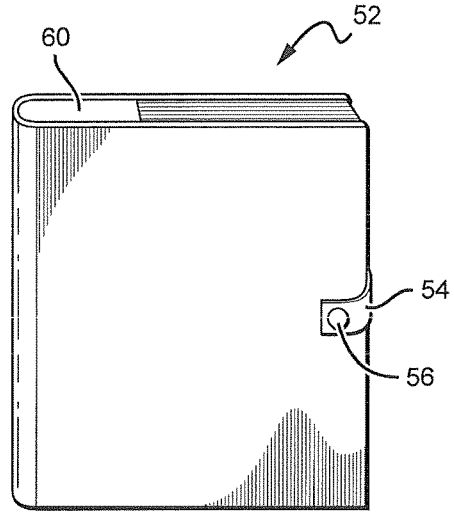
FIG. 11 illustrates an exemplary embodiment of a film or lens holder to hold removable film or interchangeable lenses.
Figure 12:
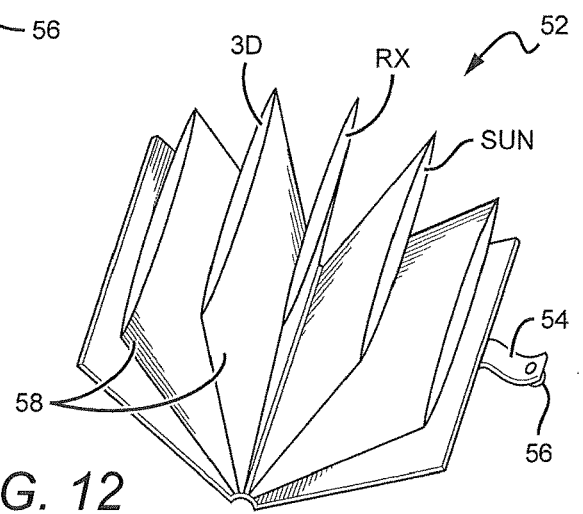
FIG. 12 illustrates an opened view of an exemplary embodiment of a film or lens holder to hold removable film or interchangeable lenses.
Figure 8A:
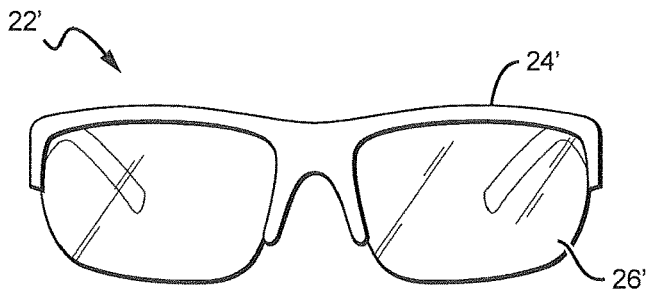
FIG. 8A illustrates the exemplary eyewear apparatus from a front view.
Figure 8B:
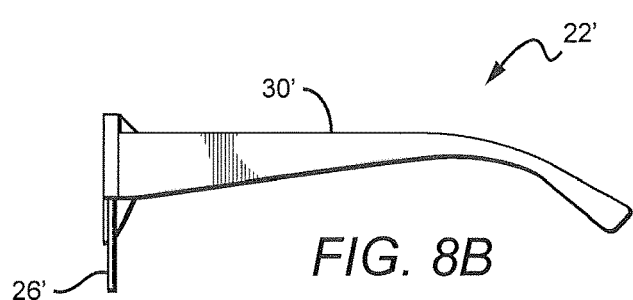
FIG. 8B illustrates the exemplary eyewear apparatus from a side view.
Figure 8C:
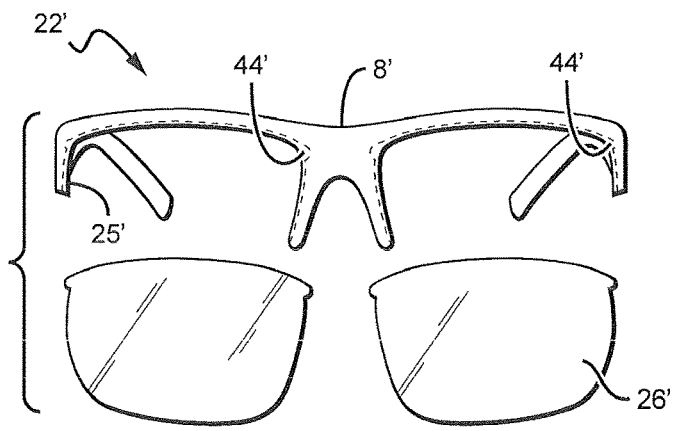
FIGS. 8C and 8D illustrate the exemplary eyewear apparatus in a separated configuration from the front and side, respectively.
Figure 8D:
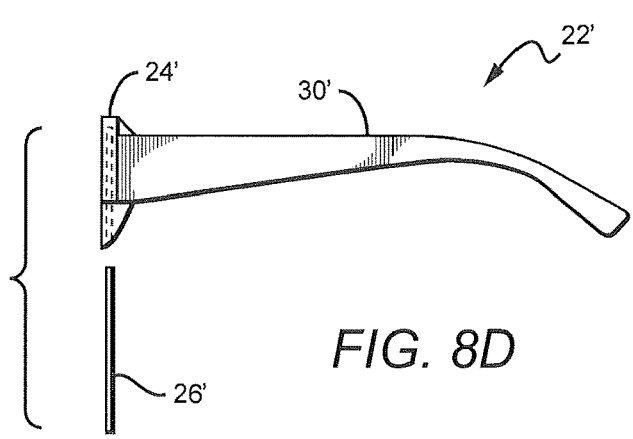

As shown for example in FIGS. 11-12, the multipurpose eyewear system may also include a carrying case or holder 52 for holding different sets of removable film 12 or interchangeable lenses 26 for eventual use with eyewear apparatus 2 or eyewear apparatus 22. The lenses/films in FIGS. 11-12 are representative of interchangeable lenses 26 of FIGS. 5-6 as well as any of the alternate replacement lenses of FIGS. 8-10 and are labeled with the generic labels associated with FIG. 6 to include all of the apostrophized variations of FIGS. 8-10.

Holder 52 may hold reusable removable film 12 and store it between uses, and/or may hold one-time use removable film 12 until it is used and discarded. Various types of removable film 12 configured to impart different functionalities may be included in holder 52, so the user may select and use removable film of different functionalities as desired. Similarly, holder 52 may hold interchangeable lenses 26 of different functionalities for use as desired.

The embodiment of holder 52 depicted in FIGS. 11-12 includes a strap 54 and button 56 that are used to close holder 52 and to help prevent any of the stored film or lenses from slipping out. Inside of holder 52 are multiple envelopes or sleeves 58 into which different sets of removable film 12 and/or interchangeable lenses 26 may be inserted and stored. The envelopes or sleeves 58 serve to keep different types of film/lenses separated, organized, and protected. Many other embodiments of holder 52 are also contemplated. For example, instead of strap 54 and button 56, a zipper or other fastening means could be used to close holder 52. Further, various shapes and sizes of holder 52 are also contemplated, e.g., to hold a variety of shapes and sizes of removable film 12 and/or interchangeable lenses 26. Eyewear apparatus 2 or eyewear apparatus 22 may also include a film or lens holder. The holder 52 may also include a separate compartment 60 for storing the frame portion for use with the removable film and/or interchangeable lenses.

Embodiments of the multipurpose eyewear system have been described herein including interchangeable lenses and/or removable films. Any of the above described embodiments may be contoured to more comfortably fit a wearer's profile. For example, the lens and/or frame may be contoured to more closely fit the facial profile of a user. The multipurpose eyewear system, including the frame, temple pieces, and/or the lenses, may also be flexible to accommodate various sized users. For example, the temple portions may be generally inwardly pointing or converging to wrap around a wearers head. However, the temple portions may be flexible so that they are pushed outward by a wearer with a larger head. Pieces of the multipurpose eyewear system may also be interchangeable to accommodate or personalize the system for wearer comfort and/or to replace pieces that may experience added wear.

Embodiments as described herein provide an improved eyewear apparatus and system, which may allow for interchangeability of the lens portion of the eyewear when warranted by the theatre or user. The disclosed embodiments for re-usable eyewear may be used for sunglasses, 3D glasses, prescription glasses, magnifying purposes and the like. In select embodiments, the nose assembly may hold the lens portion of the glasses to the frame portion of the eyewear.

Embodiments as described herein provide an improved eyewear apparatus and system whereby the eyewear may be re-used while keeping the lenses clean and new, thereby increasing the visual enjoyment view of the movie. Moreover, the nose portion may allow for adaptability of the eye wear to each individual user while still maintaining the needed refractions for viewership.

Embodiments as described herein provide an improved 3D glasses that have a degree of contour and/or curvature to allow for a more comfortable experience by the individual user. Additionally, the disclosed improved 3D glass device may be easier to manufacture, ship, clean, and store when not in use. Further, the improved 3D glasses device may be used with a filmed lens that may be combined with a standardized glass unit including both prescription glasses and sunglass units.

Although certain embodiments and examples have been described herein, it will be understood by those skilled in the art that the inventive subject matter extends beyond the specifically described embodiments and encompasses other alternative embodiments and/or uses of the invention and obvious modifications and equivalents thereof. Further, features drawn from one or other of the described embodiments can be carried into others of the described embodiments. The specifically described embodiments are exemplary. The reference to a lens, a pair of lenses, or lenses are intended to encompass both a single lens that traverses the face to generally cover both eyes, such that the lens has a pair of lens viewing portions and a bridge portion, as well as two individual lenses separately configured to cover both eyes. Accordingly, "a lens" and "a pair of lenses" are used synonymously to include both the singular and the plural of one or more lenses to cover one or both eyes during a viewing experience. Similarly, "a film" or "a pair of films" are used synonymously to include one or more films used to cover one or more eyes during a viewing experience.

The invention claimed is:

1. A multipurpose eyewear system comprising:
   a frame portion comprising a flexibly contoured and curved frame, a nose bridge and temple-pieces;
   a lens portion comprising contoured and curved lenses attached to the frame portion; and
   a removable film that is pre-sized, contoured, attachable to and removable from the lens portion of the eyewear apparatus, the removable film configured to provide additional functionality to the lens portion of the eyewear apparatus when attached thereto, the removable film comprising multiple layers of darkening film and configured to adhere to a back surface of the one of the lenses, wherein the back surface is proximal to an individual user's face,
   wherein the removable film includes a magnification property.

2. The system of claim 1 wherein the removable film provides 3D functionality.

3. The system of claim 1 wherein the lens portion is a prescription lens.

4. The system of claim 1 wherein the removable film is configured as a color anaglyph filter.

5. The system of claim 1 wherein the removable film is linearly polarized.

6. The system of claim 1 wherein the removable film is circularly polarized.

7. The system of claim 1 wherein the removable film is configured as a special interference filter.

8. The system of claim 1 wherein the removable film provides sunglasses functionality.

9. An multipurpose eyewear system comprising:
   a contoured frame portion configured to generally conform to a person's head; and
   curved lenses configured to provide a three-dimensional effect using a removable film, wherein the curved lenses correspond to the contour of the frame portion and the contoured frame portion and the 3D curved lenses are flexible, wherein the removable film is configured to adhere to a back surface of one of the curved lenses, wherein the removable film includes a magnification property.

* * * * *